3,038,944
3-CHLOROPROPYL-, AND 3-CHLORO-2-METHYL-PROPYL OCTYL SULFIDES AND CORRESPONDING SULFOXIDES AND AS NEW COMPOUNDS 3-CHLOROPROPYL-, AND 3-CHLORO-2-METHYLPROPYL OCTYL SULFOXIDES

Rector P. Louthan, Bartlesville, Okla., assignor to Phillips Petroleum Company, a corporation of Delaware
No Drawing. Filed Nov. 2, 1959, Ser. No. 850,090
24 Claims. (Cl. 260—607)

This invention relates to 3-chloropropyl octyl sulfoxides and to 3-chloro-2-methylpropyl octyl sulfoxides. In one of its aspects, the invention relates to at least one of the following compounds:

3-chloropropyl n-octyl sulfoxide
3-chloropropyl sec-octyl sulfoxide
3-chloropropyl tert-octyl sulfoxide
3-chloro-2-methylpropyl n-octyl sulfoxide
3-chloro-2-methylpropyl sec-octyl sulfoxide
3-chloro-2-methylpropyl tert-octyl sulfoxide.

In another of its aspects, the invention relates to a method of preparing a 3-chloropropyl octyl sulfide which comprises reacting an octene with 3-chloropropyl mercaptan. In a further aspect of the invention, it relates to a method of preparing a 3-chloro-2-methylpropyl octyl sulfide which comprises reacting an octene with 3-chloro-2-methylpropyl mercaptan. In a further aspect of the invention, it relates to a method for preparing the last-named two types of compounds by effecting the reaction in the presence of ionizing rays, for example, ultraviolet light. In a further aspect of the invention, it relates to the preparation of a 3-chloropropyl octyl sulfide by reacting an alkali metal mercaptide of an octyl mercaptan with 1-bromo-3-chloropropane. In a further aspect of the invention, it relates to preparing a 3-chloro-2-methylpropyl octyl sulfide which comprises reacting an alkali metal mercaptide of an octyl mercaptan with 1-bromo-2-methyl-3-chloropropane, in one embodiment the reaction being effected in the presence of methanol under substantially anhydrous conditions. In a further aspect still, the invention relates to a method of converting 3-chloropropyl octyl sulfide to the corresponding sulfoxide by oxidizing the same with a suitable oxidizing agent as set forth below. In a further aspect still, the invention relates to a method of converting 3-chloro-2-methylpropyl octyl sulfide to a corresponding sulfoxide which comprises subjecting said sulfide to the action of an oxidizing agent as set forth below.

The compounds of this invention have been found to be excellent insect repellents and their use in methods for combatting an insect and compositions containing them are set forth, described and claimed in copending application Serial No. 733,834, filed May 8, 1958 by Roy E. Stansbury and Rector P. Louthan.

The sulfoxides of the present invention have been found to be extremely efficient insect repellents, surprisingly, since other sulfoxides which have been tested have been found wholly unacceptable for repelling insects.

It is an object of this invention to prepare a new compound. It is a further object of this invention to prepare a new sulfoxide. It is a further object of this invention to prepare a 3-chloropropyl octyl sulfide. It is a further object of this invention to prepare a 3-chloro-2-methylpropyl sulfide. It is a further object of this invention to prepare a 3-chloropropyl octyl sulfoxide. It is a further object of this invention to prepare a 3-chloro-2-methylpropyl octyl sulfoxide. A further object of the invention is to provide a method for preparing at least one of the foregoing compounds.

Other aspects, objects and the several advantages of the invention are apparent from this disclosure and the appended claims.

According to this invention, new chlorine-containing sulfoxides have been discovered, these sulfoxides falling within the scope of one of the formulas

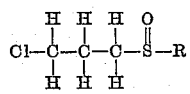

and

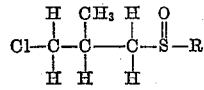

wherein R is selected from the group consisting of n-octyl, sec-octyl and tert-octyl radicals.

Also, according to the invention, methods are provided for preparing the sulfides, which are oxidized to the compounds of the invention, and for oxidizing said sulfides to the corresponding sulfoxides.

The sulfoxides of this invention are prepared by oxidizing the corresponding chlorine-containing sulfide.

In preparing the chlorine-containing sulfides from which the sulfoxides are obtained by oxidation, several different synthesis routes can be utilized. One method which can be employed is to react allyl chloride with the desired octyl mercaptan (normal, secondary and tertiary) in the presence of ultraviolet light. This reaction is carried out at a temperature of from —50 to 200° C., preferably from 0 to 100° C. at atmospheric pressure and in the presence of ultraviolet light. Ultraviolet light of a wave length of from 100 to 2,900 Angstroms is satisfactory. In forming 3-chloropropyl octyl sulfide by this reaction, the mole ratio of allyl chloride to the octyl mercaptan is generally within the range between 0.5:1 and 2:1. It is now preferred to utilize a slight excess of allyl chloride, i.e., 1.1 to 1.3 moles allyl chloride per mole of octyl mercaptan.

An alternative way of manufacturing the 3-chloropropyl octyl sulfide is to react allyl chloride with hydrogen sulfide in the presence of ultraviolet light, thus forming 3-chloropropyl mercaptan. This compound is then reacted with an octene in the presence of ultraviolet light to form the sulfide. In this synthesis route, the first step is carried out at the same temperatures and ultraviolet wave length as earlier mentioned. Pressures for this reaction will be the autogenous pressure generated by the charging of the hydrogen sulfide. Mole ratios of hydrogen sulfide to allyl chloride will generally be in the range from 1:1 to 5:1. The pressures generated by the use of these materials in these ratios will generally be from 100 to 500 pounds. After the 3-chloropropyl mercaptan is formed by the reaction of allyl chloride with hydrogen sulfide, this mercaptan is then reacted with an octene, octene-1 for example, in the presence of ultraviolet light. Atmospheric pressure is satisfactory for this reaction, and the temperatures and ultraviolet wave lengths previously described can be employed. The mole ratio of the 3-chloropropyl mercaptan to the octene usually will be in the range between 0.5:1 and 2:1. A 1:1 mole ratio is now preferred.

One further alternative method for preparing these sulfides is to form an alkali metal mercaptide of an octyl mercaptan and thereafter react this mercaptide with 1-bromo-3-chloropropane. For example, tert-octyl mercaptan is reacted with sodium hydroxide to form sodium octyl mercaptide, and this compound is reacted with 1- bromo-3-chloropropane to form 3-chloropropyl tert-octyl sulfide.

Regardless of the method used in forming the sulfide, the oxidation of this material to the sulfoxide will be the same. The now preferred oxidizing agents are peroxygen compounds selected from the group consisting of hydrogen peroxide and organic peracids. Some examples of suitable peracids are performic acid, peracetic acid and perbenzoic acid. These acids can be charged to the reaction zone as such, or can be generated in situ. A mole ratio of peroxygen compound to sulfide of from 0.5:1 to 1.5:1 usually is employed. A now preferred range is from 0.8:1 to 1:1. In carrying out this oxidation, the sulfide is dissolved in a material which is also a solvent for the peroxygen compound. Some examples of suitable solvents are methanol, ethanol, isopropanol and acetone. The oxidation usually is carried out at a temperature within the range of from 0 to 100° C., preferably from 50 to 80° C. Reaction times are usually less than one hour, although longer reaction times can be employed. It is preferable to add the oxidizing agent to the sulfide, always maintaining the sulfide in excess. This method of operation is preferred to avoid the loss of sulfoxide through formation of the sulfone. One convenient method for determining the end of the reaction period is to test for peroxygen by means of potassium iodide-starch paper, a negative test indicating completion of the reaction.

An alternative method which is considered suitable for oxidizing these sulfides is the oxidation of the sulfide with oxygen or an oxygen-containing gas such as air. This method is best carried out with the addition of a small amount of $NO_2$ or either $NO_2$ or concentrated nitric acid plus a bromine-containing compound. U.S. 2,859,248 of R. P. Louthan, issued November 4, 1958 describes and claims a method for the production of an organic sulfoxide which comprises the oxidation with an elemental oxygen-containing gas of an organic sulfide having the formula RSR wherein each R contains not more than 20 carbon atoms and the total carbon atoms does not exceed 30 carbon atoms and wherein each R is selected from the group consisting of an alkyl, cycloalkyl, aryl, aralkyl, alkaryl radical, and one of said radicals containing a hydroxy group as a substituent, in the presence of a catalyst system comprising a nitrogen compound consisting of at least one of the group consisting of $HNO_3$ and $NO_2$ and a halogen compound consisting of at least one of the group consisting of $CuCl_2$, $CuBr$, $CuBr_2$ and HBr, with the proviso that, where one of the R's contains a hydroxy group, HBr is not selected.

Furthermore, in preparing the sulfides by one of the above-described routes, it is beneficial to utilize a small amount of a hydrogen chloride scavenging agent such as ethylene oxide or propylene oxide. Copending application, Serial Number 802,031 of R. P. Louthan, filed March 26, 1959, describes and claims a method of promoting a reaction between a sulfur-containing compound which is reactive with a halogen-containing olefinic compound in the presence of activating rays to produce a compound selected from the group consisting of a thiol and a sulfide which comprises effecting the reaction in the presence of a material selected from the group consisting of an anion exchange resin and an epoxy-containing organic compound.

According to the present invention, these alkylene oxides can be present in the reaction mixture wherein the sulfides are oxidized to the sulfoxide. Furthermore, a small amount of these alkylene oxides in the new chlorine-containing sulfoxides of this invention are beneficial in preventing dehydrohalogenation during storage. These compounds apparently inhibit the decomposition via dehydrohalogenation, or they scavenge the hydrogen chloride which is generated. In any event, the use of these alkylene oxides, helps to prevent corrosion caused by generated hydrogen chloride during storage of these new chlorine-containing sulfoxides. The effectiveness of these alkylene oxides in stabilizing 3-chloropropyl octyl sulfoxides will be demonstrated hereinafter.

The following specific examples illustrate methods for manufacturing the new chlorine-containing sulfoxides, their stabilization, and use as repellents. The methyl group containing compounds of the invention can be readily prepared by one skilled in the art in possession of this disclosure by using corresponding 2-methyl compounds, e.g., 3-chloro 2-methylpropyl mercaptan in lieu of the 3-chloropropyl mercaptan.

EXAMPLE I

A run was carried out in which 3-chloropropyl n-octyl sulfide was prepared and subsequently oxidized to the corresponding sulfoxide.

In this run, 365 grams (2.5 mols) of n-octyl mercaptan and 200 grams (5 percent molar excess) of allyl chloride were charged to a reactor which consisted of a 9 inch section of 75 mm. Pyrex glass tubing, closed at one end and provided with a 40/50 standard taper female joint fastened in the other end. A glass cooling coil was wound around the inside of the tube to provide a means for controlling the temperature. Stopcocks were fastened near each end and perpendicular to the axis of the 75 mm. tube so that the reactor could be prevented prior to a run and also to provide a means for adding additional material during a run. A small stopcock was also fastened in the end of the reactor containing the taper joint so that small samples could be removed. A quartz thimble, 6 inches long, 33 mm. O.D. and provided with a flanged joint was placed on the mating joint of the reactor, and a mercury vapor lamp was fastened in the thimble. The capacity of the reactor was approximately 700 cc.

After the reactants were charged, the reactor was mounted on a horizontal shaker and shaken at about 120 cycles per minute with the mercury vapor lamp on. The contents of the reactor were irradiated at approximately room temperature with the light from a 100-watt mercury vapor lamp until the refractive index at the reaction solution failed to increase further. This required approximately one hour. During the irradiation, some hydrogen chloride was liberated, and the reaction solution changed from colorless to a bright orange. The reaction solution was then transferred to a distillation flask, and most of the unreacted allyl chloride was stripped off at atmospheric pressure by heating to 150° C. The remaining material was distilled at reduced pressure to yield 302 grams of 3-chloropropyl n-octyl sulfide, B.P. 145° C. at 7.0 mm. Hg absolute, $n_D^{20}$ 1.4770. This corresponds to a 62.7 percent conversion of the mercaptan. One hundred and thirty six grams of unreacted n-octyl mercaptan and 41 grams of high boiling material were also recovered. Thus, the ultimate yield of 3-chloropropyl n-octyl sulfide was 86.3 mol percent based on the mercaptan.

In a similar run, the same charge was irradiated with the light from a 450-watt mercury vapor lamp in place of the 100-watt lamp. Again, irradiation while shaking was carried out until a constant refractive index was obtained. In this run, a reaction time of less than 15 minutes was required.

The oxidation of this sulfide to the corresponding sulfoxide, 3-chloro-propyl n-octyl sulfoxide was carried out in a 3-necked flask, fitted with a stirrer, a reflux condenser, and a dropping funnel. In a typical run, 222.5 grams of 3-chloropropyl n-octyl sulfide and 300 cc. of methanol were charged to the flask and heated to reflux. At this time, 113.3 grams of 30 percent by weight aqueous hydrogen peroxide was then added over a 20 minute period. The reaction mixture refluxed vigorously during the $H_2O_2$ addition. After all of the hydrogen peroxide had been added, the solution was allowed to stand at least two hours to complete the oxidation. Then, about 500 cc. of water was added to precipitate this product as a second liquid phase.

Alternate methods were used to recover the product. The first method consisted of extracting the product with a solution of 500 cc. of n-pentane together with 250 cc. of ether. The product was then crystallized from the pentane-ether solution at dry ice temperature. In another run, the product from the $H_2O_2$ oxidation of 3-chloropropyl n-octyl sulfide was extracted with 250 cc. of chloroform, after which the chloroform was stripped off by heating to 80° C. at 2 mm. of Hg absolute pressure. The results of the crystallization method are shown below in Table I.

Table I

| Recovery Method | Mol Percent of Sulfoxide Based on Sulfide | Physical Properties of Sulfoxide | |
|---|---|---|---|
| | | Approx. Melting Point° C. | Refractive Index $n_D^{50}$ |
| Crystallization | 83.4 | 37–40 | 1.4740 |

EXAMPLE II

Several runs were carried out in which 3-chloropropyl n-octyl sulfide was prepared by another synthesis route.

In these runs, allyl chloride and an alkylene oxide were charged to a 1.5 gallon stainless steel reactor which was equipped with a means for irradiating the contents with ultraviolet light. After the allyl chloride was charged, hydrogen sulfide was charged to the reactor, and the contents were irradiated with a 450-watt mercury vapor lamp. After irradiation, the unreacted hydrogen sulfide was vented, and the remaining reaction solution was distilled. Most of the unreacted allyl chloride was stripped off by heating the solution to 150° C. at atmospheric pressure. The product, 3-chloropropyl mercaptan (B.P. 68° C. @ 50 mm. Hg absolute and B.P. 145° C. @ 760 mm. Hg absolute, $n_D^{20}$ 1.4935) was distilled from the stripped reaction solution at 50 mm. Hg absolute. The date for the two runs were summarized in the following table.

Table II

| | Run A | Run B |
|---|---|---|
| Charge: | | |
| Allyl chloride (grams) | 1,910 | 1,910 |
| Hydrogen sulfide (grams) | 1,700 | 1,700 |
| Propylene oxide (cc.) | 100 | |
| Ethylene oxide (cc.) | | 100 |
| Mol Ratio of Reactants ($H_2S$/allyl Cl) | 2 | 2 |
| Irradiation Time, minutes | 40 | 120 |
| Temperature, °C | 25 | 25 |
| Product: 3-chloropropyl mercaptan (grams) | 1,190 | 1,180 |
| Byproduct: 3,3′-dichlorodipropyl sulfide (grams) | 346 | 423 |
| Conversion of Allyl Chloride (percent) | 58 | 61 |

Several runs were then carried out in which the 3-chloropropyl mercaptan, prepared as described above, was reacted with octene-1 in the presence of ultraviolet light. In these runs, the reactants were charged to a reactor, after which the reactor was purged with nitrogen. The reaction mixture was then irradiated for the desired time period, after which the reaction solution was distilled at reduced pressure. Most of the unreacted octene-1 and 3-chloropropyl mercaptan was taken overhead as one cut (50 to 74° C. @ 75 mm. Hg absolute) by heating the pot to 150° C. @ 75 mm. Hg absolute. The pressure was then reduced to 12 mm. Hg absolute, and after taking 3 small intermediate cuts ($b_{12}$ 39–158° C.), the remaining 3-chloropropyl n-octyl sulfide was flashed overhead at 158–160° C. @ 12 mm. Hg absolute pressure. The runs are summarized below in the form of a table.

Table III

| Run No | C | D | E | F | G |
|---|---|---|---|---|---|
| Reactor Size | 750 cc. | 750 cc. | 750 cc. | 750 cc. | 1.5 gal. |
| Ultraviolet Lamp Size, watts | 100 | 100 | 100 | 100 | 450 |
| Charge: | | | | | |
| 3-chloropropyl mercaptan (G) | 277 | 277 | 277 | 277 | 1,197 |
| Octene-1 (grams) | 280 | 280 | 280 | 280 | 1,215 |
| Additive | None | None | (a) | (b) | None |
| Amount of Additive | | | 0.1 g. | 10 cc. | |
| Mol Ratio of Reactants | 1 | 1 | 1 | 1 | 1 |
| Irradiation Time (minutes) | 90 | 90 | 90 | 90 | 120 |
| Product Recovered (grams)c | 394 | 402 | 401 | 420 | 1,612 |
| Conversion of Reactants (percent) | 70.0 | 72.2 | 72.0 | 75.3 | 66.8 |
| Ultimate yield (percent) | 100 | 100 | 100 | 100 | 100 | a Alpha,alpha′-azodiisobutyronitrile.
b Propylene oxide.
c 3-chloropropyl n-octyl sulfide.

A portion of the 3-chloropropyl n-octyl sulfide, prepared by the method described above was then oxidized to 3-chloropropyl n-octyl sulfoxide by means of hydrogen peroxide. The apparatus employed was identical to that used in the oxidation step of Example I. In this run, an amount of hydrogen peroxide less than that theoretically required for the oxidation was employed. Accordingly, 222.5 grams of 3-chloropropyl n-octyl sulfide, 300 cc. of methanol, and 102 grams of 30 percent by weight hydrogen peroxide were charged to the oxidation reactor, the hydrogen peroxide addition requiring about 10 minutes. After 16 minutes, a negative test for peroxide was obtained with KI-starch paper, so the reaction was considered complete.

The reaction solution was diluted with 500 cc. of water, and the product phase was withdrawn and extracted with 500 cc. of n-pentane. The pentane was then stripped off under reduced pressure. The product, 3-chloropropyl n-octyl sulfoxide, amounted to 232.1 grams.

EXAMPLE III

A run was carried out in which 3-chloropropyl sec-octyl sulfide was prepared and subsequently oxidized to 3-chloropropyl sec-octyl sulfoxide.

In this run, 138.6 grams of sec-octyl mercaptan, 80 grams of allyl chloride and trace of thio-(3-naphthol) were charged to the reactor of Example I and irradiated with ultraviolet light. The thio-(3-naphthol) was employed for the purpose of promoting the reaction, but no promoting effect was obtained. After 70 minutes, the light was turned off, and the reactor contents were removed. Distillation of the reactor contents resulted in the isolation of 94.6 grams of 3-chlorpropyl sec-octyl sulfide, B.P. 132° C. @ 5.5 mm. Hg absolute. The refractive index of this material was $n_D^{20} = 1.4765$.

This sulfide was then oxidized to the sulfoxide as described in Example I, utilizing a charge of 75 grams of 3-chloropropyl sec-octyl sulfide, 115 cc. of methanol and 36 grams of 30 percent by weight aqueous $H_2O_2$. 69.8 grams of crude 3-chloropropyl sec-octyl sulfoxide, $n_D^{20} = 1.4820$ was obtained. The sulfoxide is purified by low temperature crystallization to produce the pure compound.

EXAMPLE IV

In another run, 3-chloropropyl tert-octyl sulfide was prepared and subsequently oxidized to 3-chloropropyl tert-octyl sulfoxide.

In this run, 197 grams of tert-octyl mercaptan, 250 cc. of methanol, and 59 grams of NaOH were charged to a 1-liter, 3-necked flask equipped with a stirrer and heated at reflux until all of the caustic had gone into solution. This solution was then transferred to a dropping funnel and 212 grams of 1-bromo-3-chloropropane was charged to the flask. The sodium mercaptide was then added dropwise over about a 20-minute period. The reaction was quite vigorous and sodium bromide precipitated out. After stirring a few minutes to complete the reaction, about 250 cc. of water was added to dissolve the salt (NaBr). The phases were then separated, and the oil phase was washed with dilute HCl and then with water. This phase was then distilled. The major cut, amounting to 282.0 grams, had a refractive index of $n_D^{20}=1.4855$ and boiled at 117° C. @ 5 mm. Hg absolute.

The 3-chloropropyl tert-octyl sulfide, prepared as described above, was then oxidized to the sulfoxide as in Example I. The charge for this oxidation was 100 grams of 3-chloropropyl tert-octyl sulfide, 150 cc. of methanol and 48 grams of 30 percent by weight aqueous $H_2O_2$. The material was worked up by stripping (see Example I), and 87.3 grams of 3-chloropropyl tert-octyl sulfoxide ($n_D^{20}=1.4993$) was recovered.

EXAMPLE V

Several runs were carried out in which 3-chloropropyl n-octyl sulfoxide prepared by the method described above in Example I, was admixed with various amounts of additives and heated to determine its stability.

In these runs, small amounts of the sulfoxide containing certain amounts of propylene oxide were heated in an oil bath at 115 to 120° C., and the time required for decomposition was measured. At this temperature, the decomposition point was very marked, as the material began to turn yellow with the evolution of gas, and the color rapidly changed from yellow to black. When decomposition began, only 15 to 30 seconds were required for the material to go through this change. The results of these runs are expressed below in the form of a table.

*Table IV*

| Sample No. | Additive | Amount of Additive (weight percent) | Time to Decomposition, minutes |
|---|---|---|---|
| 1 | None | 0 | 11 |
| 2 | Propylene oxide | 0.5 | 29.5 |
| 3 | do | 1.0 | 55.0 |
| 4 | do | 5.0 | >180 |
| 5 | do | 10.0 | >180 |

It can be seen from the above runs that an alkylene oxide, e.g., propylene oxide, is very effective in preventing the decomposition of the new sulfoxides of this invention.

EXAMPLE VI

A run was also carried out in which 3-chloro-2-methylpropyl n-octyl sulfide was prepared and subsequently oxidized to 3-chloro-2-methylpropyl n-octyl sulfoxide.

In this run, 100 grams of methallyl chloride and 146 grams of n-octyl mercaptan were reacted in the presence of ultraviolet light by essentially the same procedure described in Example I. An extraction-stripping recovery procedure, essentially the same as described in Example I, yielded 3-chloro-2-methylpropyl n-octyl sulfide, B.P. 147° C. @ 5 mm. Hg absolute pressure. The refractive index of this compound was $n_D^{20}=1.4751$.

The sulfide was then oxidized to the sulfoxide by the oxidation procedure of Example I, using 75 grams of 3-chloro-2-methylpropyl n-octyl sulfide, 100 cc. methanol and 36 grams of 30 percent by weight aqueous hydrogen peroxide. The reaction mixture, after completion of the reaction, was extracted with pentane, and the sulfoxide was recovered by stripping off the pentane at 62° C. @ 1 mm. Hg absolute pressure. The 3-chloro-2-methylpropyl n-octyl sulfoxide obtained amounted to 79.9 grams, and the refractive index of this compound was $n_D^{20}=1.4826$.

The following example illustrates the unexpected excellent repellent properties of the compounds prepared according to the invention, as compared with other compounds.

EXAMPLE VII

OLFACTOMETER TEST

The olfactometer is an instrument that supplies two streams of air to a cage. One stream passes through a filter on which some of the candidate repellent has been placed. The other stream is not treated and serves as a control. To conduct an olfactometer test a 0.1 gram sample of the repellent is dissolved in acetone and the solution is used to saturate a filter pad (American Optical Company R-7 filter pad of the type used in respirators). The pad is air dried and fixed over a metal tube. A glass cylinder is then fixed over the pad. This cylinder (about 4″ ID and 6″ long), in turn, is placed in contact with the wire surface of the insect cage. Similarly, an untreated pad is set up as a control.

Air is blown at the same volume rate through both pads. The number of house flies on the screen wire within the area outlined by the glass cylinder is counted after 5, 10 and 15 minutes and at 15 minute intervals thereafter until ten readings have been made. The average of these ten readings is used to determine the percent increase or decrease in number of flies on the treated circles.

The results of olfactometer tests showed that no flies alighted on the wire when the air was filtered through a pad treated with 3-chloropropyl n-octyl sufoxide. The control test gave an average of 16.2 flies. The sulfoxide was completely effective in repelling flies by this test.

EXAMPLE VIII

SANDWICH BAIT TEST

This test involves placement of a porous barrier treated with the candidate insecticide between the starved insects (house flies) and food. If the chemical is repellent, the flies will not eat. If the chemical is not repellent, the insects will eat the food through the barrier.

The bait is prepared as follows: A smooth thin film of unsulfured molasses is spread on a 1″ x 4″ strip of cardboard leaving a margin of at least ¼ inch on all sides. The purpose of the margin is to prevent the feeding of the insects unless they are actually on the strip, thus facilitating counting. These prepared strips are dried in the oven at 45° C.

Porous cover strips of lens paper are impregnated with the chemical under examination and superimposed on the bait. The paper is thin, porous, and highly absorbent. The loose fiber construction of this paper permits the fly to remove the molasses through it. In order to impregnate these strips uniformly, they are immersed in an acetone solution of the material to be tested. They are then hung over a glass rod and dried for 6 hours.

Just before the test is begun, the dried cover strips are carefully placed over the baits and fastened in place by stapling. In assembling the bait, care is taken not to press down on the bait or touch it with the fingers as the molasses is easily forced up through the cover strip. Two sandwich baits are attached to a cardboard backing. The whole assembly then is taped onto one of the jar lids that fit the opening in the rubber back of the insect cages.

The lid with the baits is fitted into an aperture in a cage so that the baits are exposed to attack. Flies over five days old which have been starved for six hours are used. Counts of the number of flies feeding on the strips are taken after five and fifteen minutes and every fifteen minutes thereafter for two and a half hours. In some cases where the chemical is not repellent, the flies eat all the molasses before the two and one half hours are up. In this case, counts are discontinued. The non-repellents become black with flies soon after being placed in the cages. The good repellents are untouched. The difference is very striking.

Table V summarizes the results of sandwich bait tests. Tests 1, 2, 3 and 4 wherein 1 percent acetone solutions were used as well as tests 5 and 6 wherein 0.5 percent solutions were applied show the effectiveness of the compounds having as one substituent the 3-chloropropyl or the 2-methyl-3-chloropropyl group and as the second substituent a normal, secondary or tertiary octyl group. Related compounds, such as those applied in tests 7 to 18 were ineffective at comparable dosages.

2.

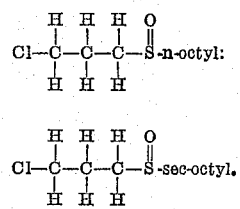

3.

*Table V.—Sandwich Bait Test With House Flies Using Various Sulfoxides*

| Test No. | Sulfoxide | Number of flies feeding at indicated time (minutes) | | | | | | | | | | | | Bait left, Percent [c] After Overnight Exposure |
|---|---|---|---|---|---|---|---|---|---|---|---|---|---|---|
| | | 5 | 15 | 30 | 45 | 60 | 75 | 90 | 105 | 120 | 135 | 150 | 165 | |
| Part A: | Sulfoxides used as 1% Acetone Solutions: | | | | | | | | | | | | | |
| 1 | 3-chloropropyl n-octyl | 0 | 0 | 0 | 0 | 0 | 0 | 0 | 0 | 0 | 0 | 0 | 0 | 100 |
| 2 | 3-chloropropyl sec-octyl | 0 | 0 | 1 | 0 | 0 | 0 | 0 | 0 | 0 | 0 | 0 | 0 | |
| 3 | 2-methyl-3-chloropropyl n-octyl | 0 | 0 | 1 | 1 | 1 | 1 | 0 | 0 | 1 | 0 | 1 | 4 | [a] 94 |
| 4 | 3-chloropropyl tert-octyl | 0 | 0 | 0 | 0 | 0 | 0 | 0 | 0 | 0 | 4 | 1 | 4 | [a] 98 |
| Part B: | Sulfoxides used as 0.5% Acetone Solutions: | | | | | | | | | | | | | |
| 5 | 3-chloropropyl n-octyl | 0 | 0 | 0 | 0 | 0 | 0 | 0 | 0 | 0 | 0 | 0 | 0 | 100 |
| 6 | 2-methyl-3-chloropropyl n-octyl | 0 | 0 | 0 | 1 | 0 | 0 | 0 | 0 | 0 | 1 | 1 | 4 | |
| Part C: | Sulfoxides used as 1% Acetone Solutions: | | | | | | | | | | | | | |
| 7 | 3-chloropropyl n-amyl | 0 | 4 | 12 | 32 | 3 | 2 | 8 | [b] | | | | | |
| 8 | 3-hydroxypropyl n-octyl | 50 | 50 | 28 | 12 | 8 | 6 | 8 | [b] | | | | | |
| 9 | 3-chloropropyl n-butyl | 19 | 42 | 28 | [b] | | | | | | | | | |
| 10 | 3-chloropropyl tert-butyl | 2 | 50 | 25 | 12 | [b] | | | | | | | | |
| 11 | 3-chloropropyl isobutyl | 10 | 50 | 22 | [b] | | | | | | | | | |
| 12 | 3-chloropropyl 2-ethylhexyl | 0 | 12 | 15 | 6 | [b] | | | | | | | | |
| 13 | 3-chloropropyl 2,4,4-trimethyl-1-pentyl | 3 | 15 | 22 | 8 | [b] | | | | | | | | |
| 14 | 3-chloropropyl tert-dodecyl | 0 | 0 | 0 | 5 | 13 | 18 | 18 | 12 | [b] | | | | |
| 15 | 3-chloropropyl dicyclopentadienyl | 0 | 0 | 0 | 14 | 8 | 1 | [b] | | | | | | |
| Part D: | Alkyl Sulfoxides used as 1% Acetone Solutions: | | | | | | | | | | | | | |
| 16 | di-n-butyl | 0 | 0 | 4 | 20 | [b] | | | | | | | | |
| 17 | n-octyl n-propyl | 3 | 3 | 3 | 3 | 0 | 0 | 0 | | 1 | | 1 | 6 | |
| 18 | tert-octyl methyl | 15 | 28 | 30 | 25 | [b] | | | | | | | | |

[a] Observation after starving flies 165 minutes.
[b] Food is gone at the indicated time and hence the test is terminated.
[c] After exposure overnight to starving flies.

Reasonable variation and modification are possible within the scope of the foregoing disclosure and the appended claims to the invention the essence of which is that there have been provided new chlorine-containing sulfoxides which are 3-chloropropyl octyl sulfoxides and 3-chloro-2-methylpropyl octyl sulfoxides; methods for preparing sulfides which can be used in the preparation of the sulfoxides, the methods essentially comprising reacting an octene with a 3-chloropropyl- and/or 3-chloro-2-methylpropyl mercaptan, and reacting an alkali metal mercaptide of an octyl mercaptan with 1-bromo-3-chloropropane and/or 1-bromo-3-chloro-2-methylpropane; a method of converting a sulfide to corresponding sulfoxide, specifically the sulfoxides of this invention, which comprises oxidizing the sulfide corresponding to the sulfoxide of this invention to a sulfoxide under conditions to yield said sulfoxide; and a stabilized sulfoxide product comprising an alkylene oxide stabilizer therein.

I claim:

1. A compound having one of the formulas $$Cl-\overset{H}{\underset{H}{C}}-\overset{H}{\underset{H}{C}}-\overset{H}{\underset{H}{C}}-\overset{O}{\underset{}{S}}-R$$

I and $$Cl-\overset{H}{\underset{H}{C}}-\overset{CH_3}{\underset{H}{C}}-\overset{H}{\underset{H}{C}}-\overset{O}{\underset{}{S}}-R$$

II wherein R is selected from the group of n-octyl, sec-octyl, and tert-octyl radicals.

4.

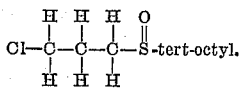

5.

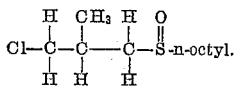

6.

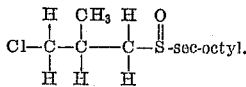

7.

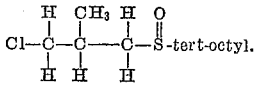

8. A method of preparing a 3-chloropropyl octyl sulfide which comprises reacting an octene with 3-chloropropyl mercaptan.

9. A method of preparing a 3-chloro-2-methylpropyl octyl sulfide which comprises reacting an octene with 3-chloro 2-methylpropyl mercaptan.

10. A method according to claim 8 wherein the reaction is effected in the presence of ultraviolet light irradiation.

11. A method according to claim 9 wherein the reaction is effected in the presence of ultraviolet light irradiation.

12. A method of preparing a 3-chloropropyl octyl sulfide which comprises reacting an alkali metal mercaptide of an octyl mercaptan with 1-bromo-3-chloropropane.

13. A method of preparing a 3-chloro-2-methylpropyl octyl sulfide which comprises reacting an alkali metal mercaptide of an octyl mercaptan with 1-bromo-2-methyl-3-chloropropane.

14. The method of claim 12 wherein the reaction is effected in the presence of methanol under substantially anhydrous conditions.

15. The method of claim 13 wherin the reaction is effected in the presence of methanol under substantially anhydrous conditions.

16. A method of preparing a 3-chloropropyl octyl sulfide which comprises reacting an octyl mercaptan dissolved in methanol with an alkali metal hydroxide, adding the reaction product thus obtained to 1-bromo-3-chloropropane, obtaining sodium bromide precipitate, separating an oil phase by adding water to obtain two phases and removing the water phase which now contains sodium bromide and obtaining said sulfide from the oil phase.

17. A method of preparing 3-chloropropyl octyl sulfide which comprises reacting an octene-1 and 3-chloropropyl mercaptan in the presence of ultraviolet light having a wave length in the range 100–2,900 Angstroms.

18. A method of preparing 3-chloro-2-methylpropyl octyl sulfied which comprises reacting an octene-1 and 3-chloro 2-methylpropyl mercaptan in the presence of ultraviolet light having a wave length in the range 100–2,900 Angstroms.

19. A method of converting a sulfide having one of the formulas

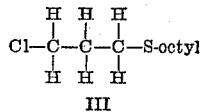

III and

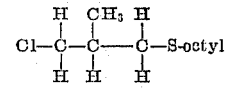

IV wherein octyl is selected from the group n, sec, and tert octyl radicals, which comprises subjecting said sulfide to the action of a peroxygen compound in the presence of a solvent which dissolves both the sulfide and said peroxygen compound.

20. A method of converting a compound selected from compounds having the formulas identified as III and IV in claim 19 which comprises oxidizing said compound with oxygen in the presence of an oxygenated compound of nitrogen which acts to convey the oxygen to said compound.

21. A method of converting a compound selected from compounds having the formulas identified as III and IV in claim 19 to the corresponding sulfoxide which comprises oxidizing said compound with an oxidizing agent under conditions to yield said sulfoxide.

22. A stabilized compound selected from compounds having the formulas identified as I and II in claim 1, the stabilizer being an alkylene oxide.

23. A method of preparing 3-chloropropyl n-octyl sulfide which comprises reacting n-octene-1 with 3-chloropropyl mercaptan.

24. A method of preparing 3-chloro-2-methylpropyl n-octyl sulfide which comprises reacting n-octene-1 with 3-chloro-2-methylpropyl mercaptan.

References Cited in the file of this patent

UNITED STATES PATENTS

| | | |
|---|---|---|
| 2,392,294 | Rust et al. | Jan. 1, 1946 |
| 2,392,295 | Rust et al. | Jan. 1, 1946 |
| 2,802,035 | Fincke | Aug. 6, 1957 |

OTHER REFERENCES

Buckley et al.: J. Chem. Soc. 1947, 1515.